United States Patent
Gurubatham et al.

[11] Patent Number: 5,673,716
[45] Date of Patent: Oct. 7, 1997

[54] DEVICE FOR SEALING THE TRANSITIONAL REGION BETWEEN A DISHWASHING MACHINE SPRAYING ARM AND ITS BEARING MEMBER

[75] Inventors: Vincent Paulraj Gurubatham, St. Joseph, Mich.; Bernhard Mohrbacher, Schönenberg/Kübelberg, Germany; Ludwin Rauber, Tholey-Bersweiler, Germany; Gerd Kloss, Hüttigweiler, Germany

[73] Assignee: Whirlpool Europe B.V., Veldhoven, Netherlands

[21] Appl. No.: 548,063

[22] Filed: Oct. 25, 1995

[30] Foreign Application Priority Data

Oct. 25, 1994 [DE] Germany .......... 44 38 058.5

[51] Int. Cl.⁶ .......... B08B 3/02
[52] U.S. Cl. .......... 134/111; 134/176; 134/179; 239/264
[58] Field of Search .......... 134/174, 172, 134/176, 179, 144, 148, 180, 560, 570, 580; 277/34; 239/264, 259

[56] References Cited

U.S. PATENT DOCUMENTS

| | | | |
|---|---|---|---|
| 3,009,470 | 11/1961 | Zurek | 134/176 |
| 3,017,892 | 1/1962 | Mixon | 134/176 |
| 3,213,866 | 10/1965 | Martiniak | 134/176 |
| 3,599,872 | 8/1971 | Guth | 134/176 |
| 3,642,207 | 2/1972 | Krogman | 239/259 |
| 3,785,566 | 1/1974 | Jenkins | 134/179 |
| 3,841,342 | 10/1974 | Cushing et al. | 134/176 |
| 3,866,837 | 2/1975 | Jenkins | 134/176 |
| 4,174,723 | 11/1979 | Long | 134/144 |
| 4,732,323 | 3/1988 | Jarvis et al. | 239/259 |
| 4,869,428 | 9/1989 | Gombar | 134/179 |

FOREIGN PATENT DOCUMENTS

| | | | |
|---|---|---|---|
| 34 30 464 A1 | 2/1986 | Germany | A47L 15/22 |
| 39 38 293 A1 | 5/1991 | Germany | A47L 15/22 |
| 40 04 319 A1 | 8/1991 | Germany | A47L 15/22 |
| 91 14 093 A1 | 11/1993 | Germany | A47L 15/22 |

Primary Examiner—Frankie L. Stinson
Attorney, Agent, or Firm—Thomas J. Roth; Mark A. Davis

[57] ABSTRACT

The invention relates to a device for sealing the transitional region between a rotatably mounted spraying arm of a dishwashing machine and its stationary bearing member by means of a sealing element, which is disposed therebetween and is impinged by the rinsing water flowing therethrough. The sealing and sliding friction functions are separated through the inclusion of a slip ring in the transitional region and this achieves significant sealing with a long service life.

9 Claims, 2 Drawing Sheets

DEVICE FOR SEALING THE TRANSITIONAL REGION BETWEEN A DISHWASHING MACHINE SPRAYING ARM AND ITS BEARING MEMBER

BACKGROUND OF THE INVENTION

1. Field of the Invention

The invention relates to a device for sealing the transitional region between a rotatably mounted spraying arm of a dishwashing machine and its stationary member by means of a sealing element which is disposed therebetween and is impinged by the rinsing water flowing therethrough.

2. Description of the Related Art

A device of this kind is known through EP 0 172 535.A1 In this known device the sealing element is configured as a radially resilient element with a gap which abuts a cylinder member assigned to the spraying arm with an axially parallel surface in a resilient manner and is supported with a radial surface against a sealing surface which is assigned to the bearing part and is parallel to the plane of the spraying arm. According to the design, the sealing element is retained in a non-rotatable manner on the spraying arm or on the bearing part via the rinsing water, the other respective side of the sealing element being exposed to a slide ring. As the supporting surface is small, the sealing element is very rapidly subject to wear and tear and this results in the seal deteriorating or even leaking.

SUMMARY OF THE INVENTION

It is the object of the invention to improve a device of the abovementioned type in such a manner that a specific seal is achieved for a long service life without considerably increasing expenditure on components.

This object can be achieved firstly according to the invention in that the sealing element is configured so as to be bellows-like and is unilaterally secured in a sealing housing which is securely connected to the bearing member, and in that the other end of the sealing element is supported on a slide ring which is secured in a sealing housing cover, which is securely connected to the spraying arm, or also in that the sealing element is attached to the spraying arm as a resilient annular flange and is supported via a slide ring on a sealing housing cover, and in that the sealing housing cover is disposed in a non-rotatable manner on a sealing housing which surrounds the bearing member.

The two solutions only require one simple slide ring on which the sealing element is supported and which accepts the slide friction and simultaneously reduces it as it is lubricated by the rinsing water. The incorporation of the sealing element into the cover, comprising sealing housing and sealing housing cover, is simple and in no way impairs the easy removablity of the spraying arm.

In one case the further development is designed in such a manner that the spraying arm is rotatably mounted in a bearing sleeve of the bearing part via a shaft and has a sleeveshaped connection, on the outside of which the sealing housing cover, which is L-shaped in cross section, is attached with the slide ring, and in that the sealing element is secured with a circumferential retaining flange in a groove of the annular sealing housing which is connected to the bearing member.

The spraying arm together with the sealing housing cover and the slide ring is removable from the shaft, which is rotatably mounted in the bearing member, a simple knurled nut retaining the spraying arm on the shaft.

In the other case the detailed design is such that the spraying arm has a sleeve-shaped connection which passes over into an end member which supports the integral resilient sealing member and is L-shaped in cross section, that the end member supports the slide ring on the side facing the spraying arm, that the slide ring is covered by the sealing housing cover, that the sealing housing cover is supported on the slide ring, and that the sealing housing together with the spraying arm, the sealing element and the sealing housing cover is removable from the shaft and the bearing member.

The removal is made possible in a simple manner in that the sealing housing is retained on the bearing member via detachable locking fingers.

According to a simple development the slide ring is made up by two annular Teflon discs.

There is an additional provision that the shaft facing away from the spraying arm is connected to a filter which is disposed in a filter housing, resulting in the rinsing water being filtered before being supplied to the spraying arm.

BRIEF DESCRIPTION OF THE DRAWINGS

The invention is further described by way of two exemplified embodiments represented in the drawings. In which.

DESCRIPTION OF THE PREFERRED EMBODIMENT

Figure 1:
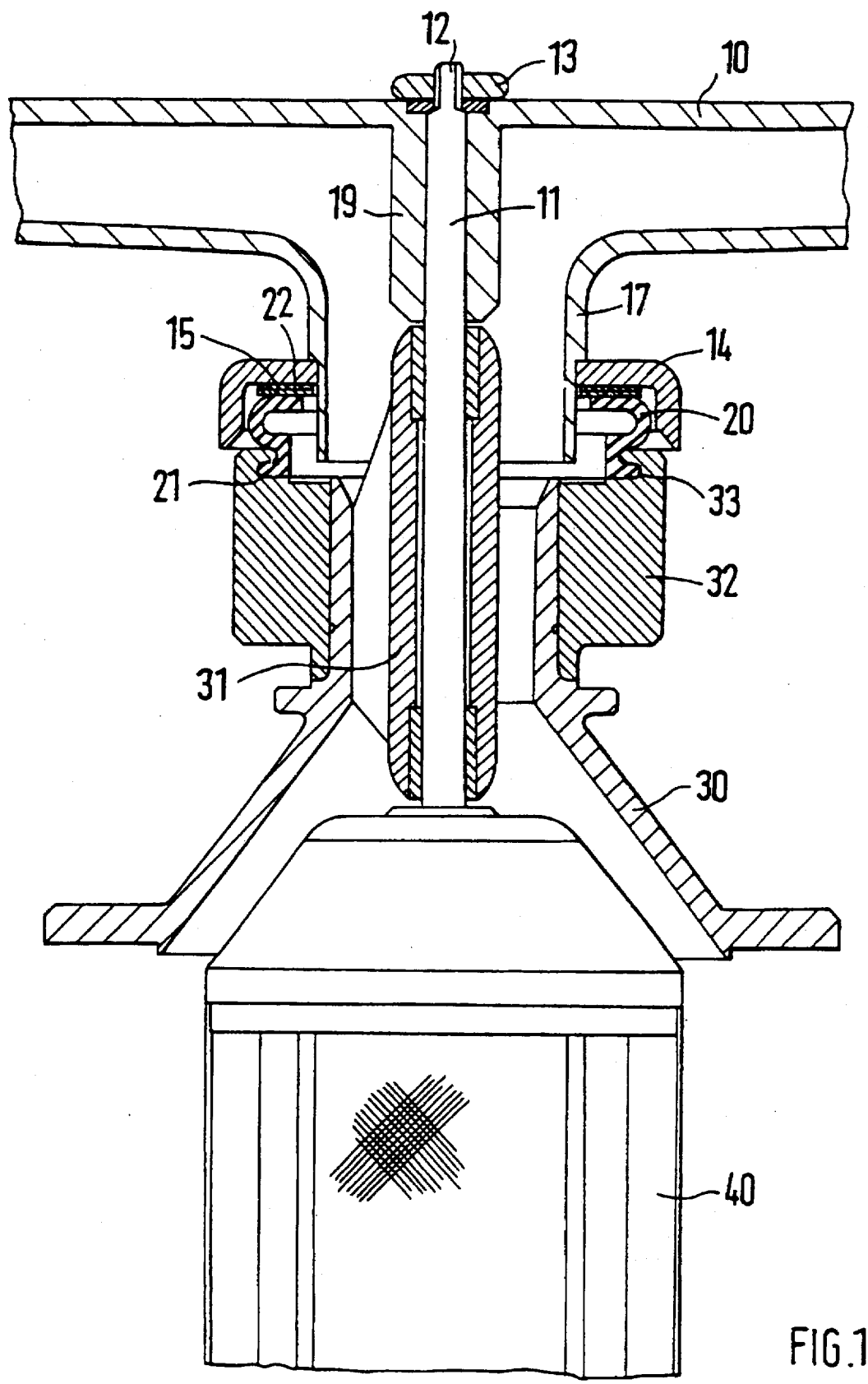
FIG. 1 is a section of the compact bearing arrangement of a spraying arm using a bellows-shaped stationary sealing element and FIG. 2 is a section of a bearing arrangement of a spraying arm, where the sealing element rotates with the spraying arm.

In the section in FIG. 1, the spraying arm 10 is only partially illustrated. A shaft 11 with a bearing sleeve 31 is rotatably mounted in a stationary bearing member 30. The spraying arm 10 is slipped onto the end of the shaft 11 with a sleeve-shaped extension 19. A knurled nut 13 is screwed onto a threaded portion 12 and the spraying arm is retained.

The rinsing water passes via the sleeve-shaped connection (17) into the spraying arm. A sealing housing cover 14, which is L-shaped in cross section, is attached to the outside of the bearing member 30 and is fixedly connected thereto. An annular sealing housing 32 is attached to the outside of the bearing member 30, which sealing housing 32 carries a sealing element 20. The end 22 of the bellows-shaped sealing element 20 facing the sealing housing 32 has a circumferential retaining flange 21 which is retained in a groove 33 of the sealing housing 32. The sealing element 20 is consequently stationary just as the bearing member 30. The free upper end 22 of the bellows-shaped sealing element 20 is supported on a slide ring 15 which is secured in the sealing housing cover 14. When the rinsing water is supplied to the spraying arm 10, the bellows of the sealing element 20 are widened and the upper end 22 of the sealing element is pressed against the slide ring 15. As the latter is formed from two annular Teflon discs, the slide friction between these two Teflon discs is displaced. The sealing element 20 only has sealing functions which it carries out much better and for a much longer service life than the known device.

If the knurled nut 13 is released, the spraying arm 10 together with the sealing housing cover 14 and the slide ring 15 can be easily removed from the shaft 11. Facing away from the spraying arm, this shaft 11 can also support a filter which is accommodated in a filter housing 40 so that the rinsing water supplied to the spraying arm 10 is filtered before it passes the bearing member 30 and reaches the connection 17.

Figure 2:
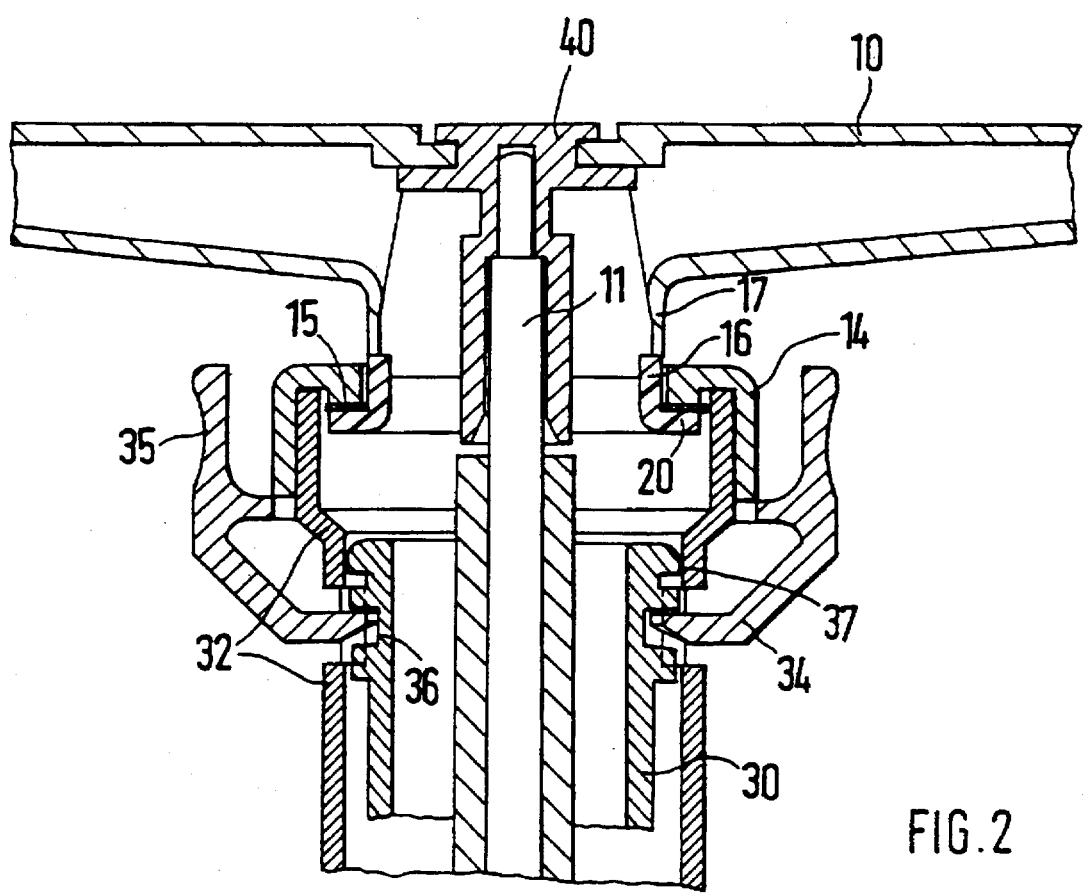

The partial section in FIG. 2 shows a solution where the sealing element 20 is attached to the spraying arm 10 in a non-rotatable manner. The connection 17 of the spraying arm 10 passes over into an end member 16 which is L-shaped in cross section and the free end portion of which is configured as an integral resilient sealing element 20. The end member 16 supports the slide ring 15 on the side facing the spraying arm 10, which slide ring 15 can also he made of two annular Teflon discs. This time the sealing housing cover 14 is connected to the sealing housing 32 which surrounds the bearing member 30 and which is now stationary just as the latter. The spraying arm 10 supports a bayonet locking portion 40 which connects the spraying arm 10 to the free end of the shaft 11. Locking fingers 34, that are detachable by means of handles 35, are integrally formed on the sealing housing 32, the locking fingers being engaged in locking receiving members 36 of the bearing member 30. When these locking connections are undone, a complete unit, comprising spraying arm 10, sealing element 20, sealing housing cover 14 and sealing housing 32, can he removed from the shaft 11 and the bearing member 30. When the sealing housing cover is removable from the sealing housing 30, access to the slide ring 15 is created.

With this design too the sealing element 20 is pressed against the slide ring 15 by the rinsing water, which slide ring accepts the slide friction again and releases the sealing element 20 from this function.

In addition the bearing part 30 can be sealed up to the sealing housing 32 as the sealing bar 37 shows.

We claim:

1. A device for sealing a transitional region between a rotatably mounted spraying arm of a dishwashing machine and its stationary bearing member, the device comprising: a sealing element, which is disposed therebetween and is impinged by the rinsing water flowing therethrough, with the sealing element having a bellows-like configuration and being unilaterally secured in a sealing housing securely connected to the bearing member, and the other end of the sealing element is supported on a slide ring secured in a sealing housing cover, which is securely connected to the spraying arm.

2. A device according to claim 1, wherein the spraying arm is rotatably mounted via a shaft in a bearing sleeve of the bearing member and has a sleeve-shaped connection, on the outer side of which the sealing housing cover, which is L-shaped in cross section, is attached with the slide ring, and the sealing element is secured with a circumferential supporting flange in a groove of the annular sealing housing which is connected to the bearing member.

3. A device according to claim 2, wherein the spraying arm together with the sealing housing cover and the slide ring is removable from the shaft.

4. A device according to claim 1, wherein the slide ring is formed from two annular Teflon discs.

5. A device according to claim 1, wherein the shaft on the side away from the spray arm is connected to a filter disposed in a filter housing.

6. A device for sealing a transitional region between a rotatably mounted spraying arm of a dishwashing machine and its stationary bearing member, the device comprising: a sealing element, which is disposed therebetween and is impinged by the rinsing water flowing therethrough, wherein the sealing element is attached to the spraying arm as a resilient annular flange and is supported via a slide ring on a sealing housing cover, and the sealing housing cover is disposed in a non rotatable manner on a sealing housing which surrounds the bearing member.

7. A device according to claim 6, wherein the spraying arm has a sleeve-shaped connection, which changes over into an end member which supports the integral resilient sealing element and is L-shaped in cross section, the end member supports the slide ring on the side facing the spraying arm, the slide ring is covered by the sealing housing cover, the sealing housing cover is supported on the slide ring, and the sealing housing together with the spraying arm, the sealing element and the sealing housing cover is removable from the shaft and the bearing member.

8. A device according to claim 7, wherein the sealing housing is retained on the bearing member via removable locking fingers.

9. A device according to claim 6, wherein the sealing housing cover is removable from the sealing housing, and in that the bearing member is sealed additionally towards the sealing housing.

* * * * *